Figure 1:
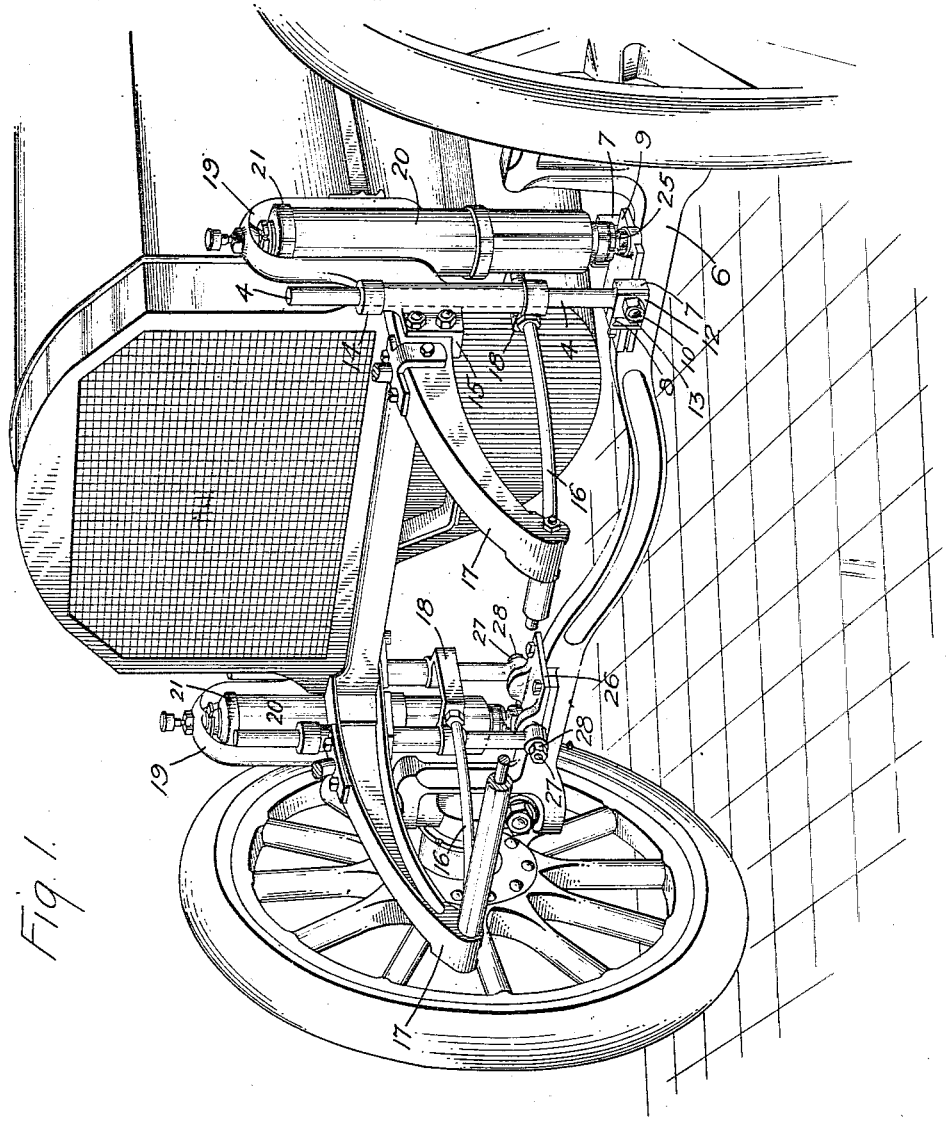

G. WESTINGHOUSE.
VEHICLE SUPPORTING DEVICE.
APPLICATION FILED OCT. 15, 1910.

1,031,759.

Patented July 9, 1912.

2 SHEETS—SHEET 1.

WITNESSES:

INVENTOR.
George Westinghouse
BY
HIS ATTORNEY IN FACT.

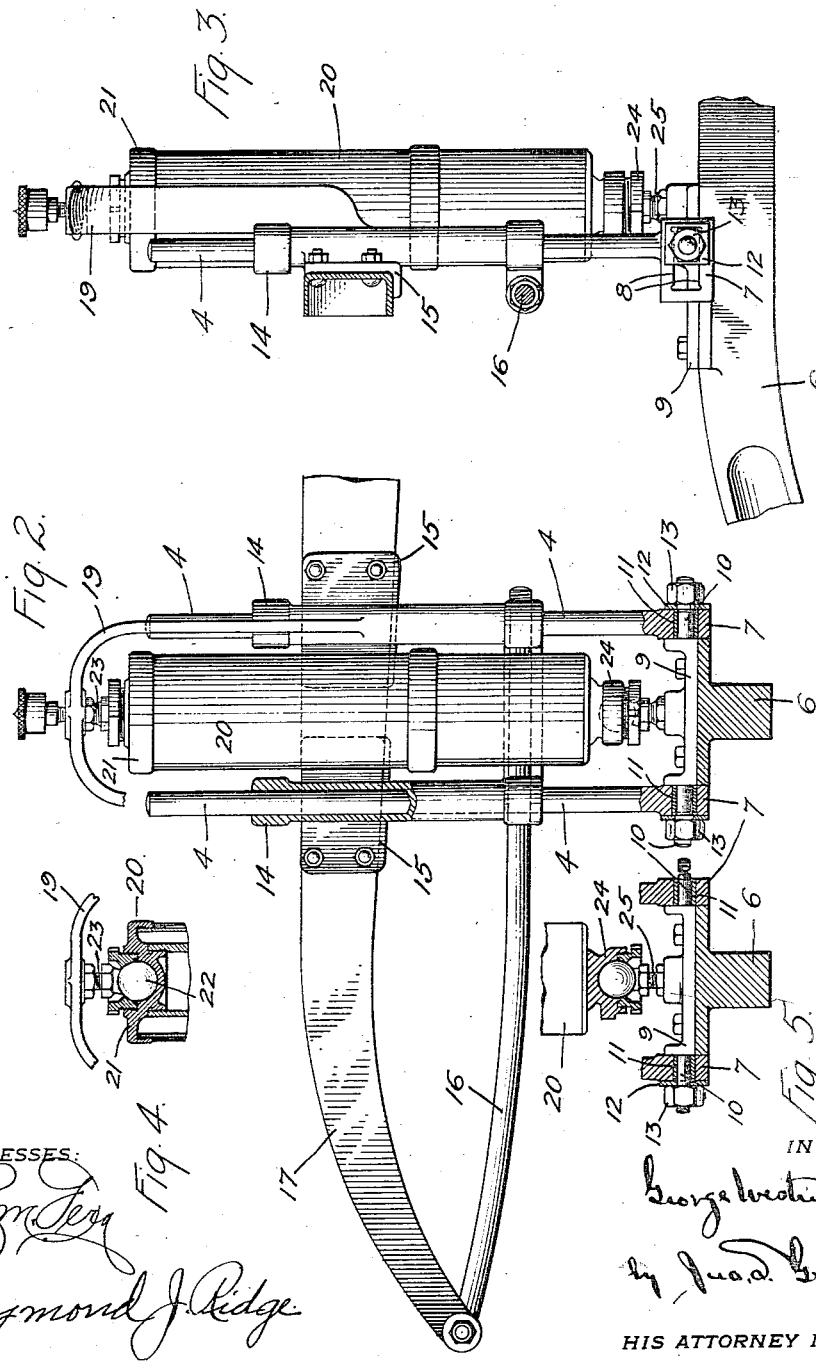

UNITED STATES PATENT OFFICE.

GEORGE WESTINGHOUSE, OF PITTSBURGH, PENNSYLVANIA.

VEHICLE SUPPORTING DEVICE.

1,031,759.

Specification of Letters Patent.

Patented July 9, 1912.

Application filed October 15, 1910. Serial No. 587,214.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Improvements in Vehicle Supporting Devices, of which the following is a specification.

This invention relates to vehicles comprising running gear, a frame or load platform, interposed means for affording elastic support for the latter and additional means for maintaining an operative running position of the running gear with respect to the frame and the direction of movement while permitting all of the relative vertical movements necessary for practical elastic cushion support of the frame.

It relates more particularly to devices of the above class, in which the elastic load supporting devices afford vertical support only and are not intended to withstand lateral thrusts or strains.

The relative movements that are to be limited or prevented by the linkages are fore and aft and lateral movements of the axle and also fore and aft rocking thereof. The movements to be permitted are relative vertical movements of the axle, both where such relative vertical movement is equal for both ends of the axle so that the latter maintains its normal parallelism with the plane of the frame and also where such relative vertical movement is greater or different in direction at one end of the axle from the movement at the other end thereof so as to produce an endwise tilt of the axle with respect to the frame.

The main general object of the present invention is to improve correlatively and also with relation to the vehicle as a whole the instrumentalities that perform the complementary functions of elastically supporting the weight of the car body on the wheels and of imparting forward travel from the wheels to the car body and vice versa. The latter instrumentalities are the means for preventing fore and aft bodily movement of the axle.

The springs used in this invention for elastically supporting the weight of the vehicle frame and the parts carried thereby on the wheels are preferably of the telescopic pneumatic cylinder type, such for example, as shown in one of my co-pending applications. Such devices discharge their functions to best effect when they act solely as compression members and are subjected to no lateral stresses. In the preferred form of the invention, the instrumentalities that impart forward travel from the wheels to the vehicle body and vice versa, in addition to preventing the harmful relative movements and permitting the necessary ones, form the supporting agents for the devices which elastically support the weight of the car body on the wheels, and with them make up organized devices capable, with slight modification, of being embodied in vehicles of different types and classes.

A further object of this invention is to provide suitable means for securing the pneumatic springs (telescoping cylinders) to the vehicle frame and the axle in such manner as to admit of universal angular movements.

The invention is illustrated in the accompanying drawings by certain of the possible embodiments thereof and in said drawings which form part of this application and throughout which similar elements are denoted by like characters,—Figure 1 is a view in perspective of the forward end or front of a motor vehicle, in which this invention is utilized and embodied; Fig. 2 is a view in side elevation of one of the organized devices, portions of the same being shown in section for the purpose of clearer illustration; Fig. 3 is a view in front elevation of the organized device shown in Fig. 2; Figs. 2 and 3 illustrating in more or less detail the device illustrated on the right side of the view shown in Fig. 1; and Figs. 4 and 5 are detail sectional views of the mountings for the top and bottom respectively of the springs.

In order to accommodate relative vertical movements of the axle, where such relative vertical movements are greater or different in direction at one end of the axle from the movement at the other end thereof, producing an endwise tilt of the axle with respect to the frame, the devices on the opposite sides of the vehicle must be slightly different in their manner of connection to the axle. The device shown in Figs. 2 and 3 and on the right hand side of Fig. 1, which in Fig. 1 is on the left side of the vehicle, consists of two vertical guide rods 4 pivotally secured to axle 6 in the following manner: The lower end of each rod 4 is enlarged as at 7 and the enlargement is machined to form a box guide way, having parallel guide surfaces 8. A plate or pad 9 bolted to axle 6 is provided with outwardly extending pivot pins 10, preferably formed integrally with the pad. Rectangular blocks 11 mounted on said pins 10, which lie within the opening in the enlarged portion 7, reciprocate on bearing surfaces 8, as the axle 6 tilts endwise. The blocks are held in place on pins 10 by means of washers 12 and nuts 13. Rods 4 lie within guides 14 formed integrally with a bracket 15, which is bolted to the forward end of the vehicle frame. These guides are braced by means of struts 16, which at one end are secured to the forward end of the horns 17 of the vehicle frame and at the other end are screwed into a brace 18, which connects guides 14 and which is preferably formed integrally therewith.

At their tops, guides 14 are joined together by means of a yoke 19, preferably formed integrally with the guides and in which the bearing for the top of the pneumatic spring 20 is located.

The pneumatic spring 20 is secured to the yoke 19 and pad 9 by means of ball and socket joints, as illustrated in Figs. 4 and 5 respectively. The upper cap 21 of the spring is provided with a ball socket within which a ball 22 carried on a stud 23 is situated. The stud 23 is screwed into the yoke 19. The lower cap 24 of the spring is provided with a similar ball socket and stud 25 of the ball located therein is screwed into pad 9. The telescoping members of the spring are thus positively locked to the vehicle frame and axle in such manner as to admit of universal angular movement. The device on the right side of the vehicle, which is the one illustrated on the left side of Fig. 1, is identically the same as the device just described with the exception that the rods of this device are pivotally connected to pad 26 and are prevented from moving longitudinally of the axle. Pad 26 is provided with two pivot pins 27. The rods are enlarged and bored out to receive the pins and are locked in place thereon by means of nuts 28. By this means, the rods are securely tied to the axle and lateral movement of the axle is thereby prevented, while at the same time it is allowed to freely tilt endwise.

Having thus described my invention, what I claim is:

1. In a vehicle, the combination with a body frame having side bars terminating in horns and running gear including an axle, of running-stress-transmitting-devices, each including parallel rods and guides therefor interposed between the body frame and running gear, body supporting springs associated with said devices for elastically supporting the vehicle body frame and braces extending from said horns to said guides.

2. In a vehicle, the combination with a body frame and running gear including an axle, of running-stress-transmitting-devices, including parallel rods and guides therefor connecting the body frame and axle and constructed and arranged to allow endwise tilting of the axle and parallel movement of the axle toward and from the body frame and body-frame-supporting-pneumatic-cylinders associated with said devices and pivotally connected thereto.

3. In a vehicle, the combination with a body frame and running gear including an axle, of running-stress-transmitting-devices, including parallel rods and guides therefor interposed between the body frame and axle, a yoke connecting the guides and body-supporting-pneumatic-cylinders pivotally connected to said yoke.

4. In a vehicle, the combination of a body frame and running gear including an axle, a pair of running-stress-transmitting-devices, one located on each side of said body frame and interposed between said body frame and said axle, each device including parallel rods and guides therefor, yokes connecting said guides and body-supporting-pneumatic-cylinders pivotally connected to said yokes and interposed between said yokes and the axle.

5. In a vehicle, the combination of a body frame and running gear including an axle and a pair of running-stress-transmitting-devices, one located on each side of said body frame and interposed between said body frame and said axle, each device including parallel rods and guides therefor, yokes connecting said guides and body-supporting-pneumatic-cylinders pivotally connected to said yokes and interposed between said yokes and the axle, one of said devices being pivotally connected to the axle in such manner as to prevent endwise movement of said axle relative to said body frame, while the other device is pivotally connected to said axle in such manner as to be capable of movement lengthwise of the same to permit of free endwise tilting of said axle.

In testimony whereof, I have hereunto subscribed my name this 13th day of October, 1910.

GEO. WESTINGHOUSE.

Witnesses:
 B. B. HINES,
 JNO. S. GREEN.